(12) United States Patent
Weng et al.

(10) Patent No.: US 8,700,403 B2
(45) Date of Patent: Apr. 15, 2014

(54) UNIFIED TREATMENT OF DATA-SPARSENESS AND DATA-OVERFITTING IN MAXIMUM ENTROPY MODELING

(75) Inventors: Fuliang Weng, Mountain View, CA (US); Lin Zhao, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 2132 days.

(21) Appl. No.: 11/266,867

(22) Filed: Nov. 3, 2005

(65) Prior Publication Data
US 2007/0100624 A1    May 3, 2007

(51) Int. Cl.
G10L 15/14 (2006.01)
G06F 17/28 (2006.01)
G06F 17/27 (2006.01)
G06F 17/21 (2006.01)
G10L 15/26 (2006.01)
G10L 19/14 (2006.01)
G10L 21/06 (2013.01)

(52) U.S. Cl.
USPC ............... 704/256.2; 704/4; 704/9; 704/10; 704/235; 704/224; 704/256.1; 704/256.3; 704/256.4; 704/256.5; 704/256.7; 704/256.8; 704/276

(58) Field of Classification Search
USPC .......... 704/2, 9, 10, 224, 240, 256.2, 3, 4, 7, 704/276, 235, 243, 256.1–256.8
See application file for complete search history.

(56) References Cited

U.S. PATENT DOCUMENTS

| | | | |
|---|---|---|---|
| 5,748,841 A * | 5/1998 | Morin et al. | 704/257 |
| 5,839,105 A * | 11/1998 | Ostendorf et al. | 704/256 |
| 6,049,767 A * | 4/2000 | Printz | 704/240 |
| 6,292,767 B1 | 9/2001 | Jackson et al. | |
| 6,304,841 B1 * | 10/2001 | Berger et al. | 704/2 |
| 6,697,769 B1 * | 2/2004 | Goodman et al. | 703/2 |
| 7,716,056 B2 * | 5/2010 | Weng et al. | 704/275 |
| 2002/0111780 A1 * | 8/2002 | Sy | 703/2 |
| 2002/0111793 A1 * | 8/2002 | Luo et al. | 704/10 |
| 2002/0188421 A1 * | 12/2002 | Tanigaki et al. | 702/181 |
| 2002/0198714 A1 * | 12/2002 | Zhou | 704/252 |
| 2003/0126102 A1 * | 7/2003 | Borthwick | 706/21 |
| 2005/0021317 A1 * | 1/2005 | Weng et al. | 703/2 |
| 2006/0074670 A1 * | 4/2006 | Weng et al. | 704/257 |
| 2007/0043556 A1 * | 2/2007 | Goodman | 704/200 |
| 2008/0015864 A1 * | 1/2008 | Ross et al. | 704/275 |

FOREIGN PATENT DOCUMENTS

EP    1079371 A1 *   2/2001   ........... G10L 15/26

OTHER PUBLICATIONS

McCallum et al., "Early results for Named Entity Recognition with Conditional Random Fields, Feature Induction and Web-Enhanced Lexicons," Proceedings of the seventh conference on Natural Language learning at HLT-NAACL 2003, p. 188-191, May 31, 2003.*
S. Clark and J. R. Curran. 2004. "Parsing the wsj using ccg and log-linear models." In Proceedings of the 42nd Annual Meeting of the Association for Computational Linguistics (ACL '04).*
Greiff et al., "The maximum entropy approach and probabilistic IR models", ACM 2000.*

(Continued)

Primary Examiner — Edgar Guerra-Erazo
(74) Attorney, Agent, or Firm — Kenyon & Kenyon LLP

(57) ABSTRACT

A method of statistical modeling is provided which includes constructing a statistical model and incorporating Gaussian priors during feature selection and during parameter optimization for the construction of the statistical model.

18 Claims, 11 Drawing Sheets

(56) References Cited

OTHER PUBLICATIONS

Weng, F. et al.: "A novel probabilistic model for link unification grammar," Proceedings of the Seventh International Workshop in Parsing Technologies, Beijing, Oct. 17-19, 2001.
Li, Wei, et al. "Rapid Development of Hindi Named Entity Recognition Using Conditional Random Fields and Feature Induction", ACM Transactions on Asian Language Information Processing 2003, vol. 2, No. 3, 2003, pp. 290-294.
Seneff, Stephanie, "TINA: A Natural Language System for Spoken Language Applications", Computational Linguistics USA, vol. 18, No. 1, Mar. 1992, pp. 61-86.
Chen, Stanley, F, et al., "A Survey of Smoothing Techniques for ME Models", IEEE Transactions on Speech and Audio Processing, IEEE Service Center, vol. 8, No. 1, Jan. 2000.
Smith, Andrew et al. "Regularisation Techniques for Conditional Random Fields: Parameterised Versus Parameter-Free", Natural Language Processing-IJCNLP 2005, Second International Joint Conference, Oct. 11, 2005, pp. 896-907.
Chen, Stanley F and Rosenfeld, Ronald, "Efficient Sampling and Feature Selection in Whole Sentence Maximum Entropy Language Models", 1999 IEEE International Conference on Acoustics, Speech and Signal Processing, vol. 1, Mar. 15, 1999, pp. 549-552.
European Search Report, Jan. 23, 2007, from European Patent Application No. 06022887.1-2225.
Clark, Stephen et al., "Parsing the WSJ Using CCG and Log-Linear Models," Proceedings of the $42^{nd}$ annual Meeting on Association for Computational Linguistics, ACL'04, pp. 1-8, 2004.
Abney, S. P., "Parsing by Chunks," In: Robert Berwick, Steven Abney and Carol Tenny (eds.), Principle-Based Parsing, Kluwer Academic Publishers, Dordrecht, pp. 1-18, 1991.
Berger, A. L. et al., "A Maximum Entropy Approach to Natural Language Processing," Computational Linguistics, 22 (1):39-71, 1996.
Bod, R., "An Efficient Implementation of a New DOP Model," Proceedings EACL'03, Budapest, Hungary, pp. 19-26, 2003.
Brill, E., "Transformation-Based Error-Driven Parsing," 3rd International Workshop on Parsing Technologies, SIGPARSE, pp. 1-13, 1993.
Carbonell, J. G. et al., "Recovery Strategies for Parsing Extragrammatical Language," American Journal of Computational Linguistics, 9:3-4, pp. 123-146, 1983.
Charniak, E. et al., "Edit Detection and Parsing for Transcribed Speech," Proceedings of the 2nd Meeting of the North American Chapter of the Association for Computational Linguistics, pp. 118-26, 2001.
Chen S. et al., "A Gaussian Prior for Smoothing Maximum Entropy Models," Technical Report CMU-CS-99-108, School of Computer Science, Carnegie Mellon University, Pittsburgh, PA. pp. 1-23, 1999.
Chen S. et al., "Efficient Sampling and Feature Selection in Whole Sentence Maximum Entropy Language Models," Proceedings of ICASSP-1999, Phoenix, Arizona,1999.
Cheng et al., "A Wizard of Oz Framework for Collecting Spoken Human-Computer Dialogs," in INTERSPEECH-2004.
Chelba C. et al., "Adaptation of Maximum Entropy Capitalizer: Little Data Can Help a Lot," Proceedings of EMNLP, Barcelona, Spain, 2004.
Chinchor, N., "Overview of MUC-7 /MET-2," In Proceedings of the Seventh Message Understanding Conference (MUC7), 1998.
Collins, M., "Head-Driven Statistical Models for Natural Language Parsing," MIT Comp. Science and Artificial Intelligence Laboratory, 29(4), pp. 589-637, 2003.
Collins, M., "Three Generative, Lexicalised Models for Statistical Parsing," Proceedings of the 35th Annual Meeting of the ACL (jointly with the 8th Conference of the EACL), Madrid, pp. 16-23, 1997.
Daelemans, W. et al., "TiMBL: Tilburg Memory-Based Learner," version 4.0 Reference Guide, ILK Technical Report-ILK 01-04, Introduction to Linguistic Knowledge Computational Linguistics, pp. 1-48, 2001.
De Meulder et al., "Memory-Based Named Entity Recognition Using Unannotated Data," In Proceedings of CoNLL-2003, Edmonton, Canada.
Dowding, J. et al., "Interleaving Syntax and Semantics in an Efficient Bottom-Up Parser," Proceedings of the 32nd Annual Meeting of the Association for Computational Linguistics, Las Cruces, NM, pp. 110-116, 1994.
Frazier et al., "The Sausage Machine: A New Two-Stage Parsing Model," Cognition, 6:291-325, 1978.
Goodman, J., "Sequential Conditional Generalized Iterative Scaling," Proceedings of the $40^{th}$ Annual Meeting of the Association for Computational Linguistics (ACL), Philadelphia, pp. 9-16, 2002.
Goodman J., "Exponential Priors for Maximum Entropy Models," North American ACL 2004.
Gorin, et al., "How May I Help You?," Speech Communication, 23:113-127, 1997.
He, Y. et al., "Robustness Issues in a Data-Driven Spoken Language Understanding System," HLT-NAACL Workshop on Spoken Language Understanding for Conversational Systems and Higher Level Linguistic Information for Speech Processing, Boston, 2004.
Heeman, P. et al., "Detecting and Correcting Speech Repairs," Association for Computational Linguistics, Las Cruces, New Mexico, pp. 294-302, 1994.
Hinlde, D., "Deterministic Parsing of Syntactic Non-Fluencies," Proceedings of 21st Annual Meeting of Association for Computational Linguistics, pp. 123-128, 1983.
Jackson, E. et al., "A Template Matcher for Robust NL Interpretation," in Proceedings of DARPA Speech and Natural Language Workshop, pp. 190-194, 1991.
Klein et al., "Accurate Unlexicalized Parsing," Proceedings of 41st Annual Meeting of Association for Computational Linguistics, 2003.
Levelt, W., "Monitoring and Self-Repair in Speech," Cognition, 14:41-104, 1983.
Mikheev, A. et al., "Description of the LTG System Used for MUC-7," Proceedings of MUC-7, pp. 1-12, 1998.
Nuance Speech Recognition System, 8.0: Grammar Developer's Guide, pp. 1-181.
Pallett et al., "1998 Broadcast News Benchmark Test Results: English and Non-English," Proceedings of the DARPA Broadcast News Transcription and Understanding Workshop, Lansdowne, Virginia, 1998.
Pietra, S. et al., "Inducing Features of Random Fields," IEEE-PAMI, 19 (4):1-34, 1995.
Ratnaparkhi A., "Maximum Entropy Models for Natural Language Ambiguity Resolution," Ph.D. thesis, University of Pennsylvania, pp. 1-147, 1998.
Riley, M. et al., "Transducer Composition for Context-Dependent Network Expansion," Proc. Eurospeech, 1997.
Rosenfeld, R., "Adaptive Statistical Language Modeling: A Maximum Entropy Approach," Ph.D. thesis, Carnegie Mellon University, pp. 1-104, 1994.
Shriberg E., "Preliminaries to a Theory of Speech Disfluencies," Ph. D. thesis, University of California at Berkeley, pp. 1-203, 1994.
Shriberg E. et al., "Prosody modeling for Automatic Speech Understanding: an Overview of Recent Research at SRI," in Proc. ISCA Workshop on Speech Recognition and Understanding, pp. 13-16, 2001.
Weng, F. et al., "A Conversational Dialogue System for Cognitively Overloaded Users," Proceedings of the $8^{th}$ International Conference on Spoken Language, Interspeech 2004-ICSLP, Jeju Island, Korea, Oct. 4-8, 2004.
Wutiwiwatchai A. et al., "Hybrid Statistical and Structural Semantic Modeling for Thai Multi-Stage Spoken Language Understanding," HLT-NAACL Workshop on Spoken Language Understanding for Conversational Systems and Higher Level Linguistic Information for Speech Processing, Boston, 2004.
Zhou Y. et al., "A Fast Algorithm for Feature Selection in Conditional Maximum Entropy Modeling," Proceedings of EMNLP 2003.

* cited by examiner

MP3 Test Results Comparison for Use of Feature Selection and/or Gaussion Priors

| Train Data | W/o FS W/o Prior | W/o FS With Prior | W FS W/o Prior | W FS W Prior in Opt | W FS With Prior in both FS & Opt |
|---|---|---|---|---|---|
| 25% (subset0) (1489 fts) | 95.21% | 96.02% | 94.71% | 96.35% | 96.35% |
| 25% (subset1) (1092 fts) | 94.83% | 95.37% | 93.98% | 95.64% | 95.31% |
| 25% (subset2) (590 fts) | 93.41% | 93.50% | 94.66% | 94.64% | 94.46% |
| 25% (subset3) (673 fts) | 94.58% | 95.00% | 94.69% | 95.62% | 95.56% |
| 50% (1730 fts) | 95.77% | 96.08% | 95.41% | 96.39% | 96.27% |
| 75% (2278 fts) | 95.73% | 95.96% | 95.52% | 96.31% | 96.39% |
| 100% (2897 fts) | 96.58% | 96.62% | 96.37% | 96.94% | 96.75% |

Figure 7

WSJ Test Results Comparison for Use of Feature Selection and/or Gaussion Priors

| | Evaluation Data (using the whole training set) |
|---|---|
| no SGC feature selection, no Gaussian prior | 90.49% |
| no SGC feature selection, prior in optimization | 90.47% (m=0, v=2) |
| SGC feature selection, no Gaussian prior | 93.39% |
| SGC feature selection, prior in optimization | 93.42% (m=0, v=2) |
| SGC feature selection, prior in both sel & opt | 93.50% (m=0, v=2) |

Figure 8

Comparison of feature selection with and without Gaussian Priors.

| Cutoff | | Evaluation Data | |
|---|---|---|---|
| 0 | Before priors | 93.41% | |
|  | After priors | 75%~100% samples | 93.45% |
|  |  | 25%~50% samples | 93.48% |
| 5 | Before priors | 93.40% | |
|  | After priors | 75%~100% samples | 93.41% |
|  |  | 25%~50% samples | 93.48% |

Figure 10

UNIFIED TREATMENT OF DATA-SPARSENESS AND DATA-OVERFITTING IN MAXIMUM ENTROPY MODELING

FIELD OF THE INVENTION

The present invention relates to a unified treatment of data-sparseness and data overfitting in maximum entropy modeling.

BACKGROUND OF THE INVENTION

Key-word spotting and rule-based approaches have been widely used techniques in the area of spoken language understanding partly because of their robustness to speech recognition and human errors and partly because of their adequate applications in relatively simple application domains dealing with relatively simple language subsets. See, for example, Jackson et al. "A template matcher for robust natural language interpretation", In Proceedings of DARPA Speech and Natural Language Workshop, 1991, Seneff, "TINA: a natural language system for spoken language applications, Computational Linguistics. Vol. 18, No. 1. pp. 61-86, 1992, Dowding, et al. "Interleaving Syntax and Semantics in an Efficient Bottom-Up Parser", In the Proceedings of the 32nd Annual Meeting of the Association for Computational Linguistics, Las Cruces, N.Mex., 1994.

Commercial speech companies have adopted key-word spotting and rule-based techniques in their products. See, for example, products by Nuance Communications, Inc. 2001, including the Nuance Speech Recognition System, 8.0: Grammar Developer's Guide, and by Scansoft, Inc. 2004, including the ScanSoft VoCon 3200: Software Development Kit, Developer's Guide. Version 2.0. February, 2004.

As more applications are included spoken dialog systems, the limited usage of spoken language imposed by the systems, shallow understanding, and/or miscommunication with the system, may annoy the users and delay the adoption of such systems in environments.

In this regard, data sparseness may be a common problem for statistical-based approaches when there is not enough data for training. This may be particularly important when a new application needs to be developed quickly to respond to a market need. However, where a model uses too many parameters to fit a training data set, the resulting model may become overlit to the particular data set without much robustness to account for any unforeseen data.

In the past, smoothing methods for maximum entropy modeling have attracted attention in language process and information retrieval research, among which, using Gaussian priors in smoothing has been successful, especially when data is sparse. However, when applying the priors, past research work has simply used a cut-off technique for feature selection and therefore Gaussian prior is only applied during parameter computation. In other words, past work only addresses the data sparseness issue without considering the data overfitting issue.

Before mature speech recognition technologies were available, understanding spoken language was primarily investigated under the subject of dealing with extra-grammaticality, then an important topic in computational linguistics, as discussed, for example by J. Carbonell & P. Hayes in "Recovery Strategies for Parsing Extragrammatical Language," American Journal of Computational Linguistics, Vol. 9 (3-4), 1983, D. Hindle, in "Deterministic Parsing of Syntactic Non-fluencies," Proceedings of 21st Annual Meeting of Association for Computational Linguistics, pp. 123-128, 1983, and W. Levelt in "Monitoring and Self-repair in Speech," Cognition, 14:41-104, 1983. With the push from DARPA HLT programs for more than a decade, research in this area has advanced to a new level.

Among others, key-word spotting and rule-based approaches have been widely used techniques in the area of spoken language understanding partly because of their robustness to speech recognition and human errors, and partly because of their adequate applications in relatively simple application domains dealing with relatively simple language subsets, as discussed, for example, in Jackson et al. in "A template matcher for robust natural language interpretation," Proceedings of DARPA Speech and Natural Language Workshop, 1991, Seneff in "TINA: a natural language system for spoken language applications," Computational Linguistics, Vol. 18, No. 1. pp. 61 to 86, 1992, Dowding et al. in "Interleaving Syntax and Semantics in an Efficient Bottom-Up Parser," Proceedings of the 32nd Annual Meeting of the Association for Computational Linguistics, Las Cruces, N.Mex., 1994, and U.S. Pat. No. 6,292,767 entitled "Method and system for building and running natural language understanding systems," which was filed on Dec. 21, 1995 and granted in 2001. Because of their success, even commercial speech companies, such as Nuance and Scansoft, have adopted these techniques in their products. See, for example, the Nuance Speech Recognition System, 8.0: Grammar Developer's Guide, published 2001 by Nuance Communications, Inc. 2001, and the ScanSoft VoCon 3200: Software Development Kit, Developer's Guide, Version 2.0, published February, 2004 by Scansoft, Inc. 2004. With the increase of new applications in a dialog system, the limited usage of spoken language imposed by the systems may annoy the users and delay the adoption of such systems in various fields.

In the area of parsing written texts, a related field to spoken language understanding, statistical methods have dominated the performance on the Wall Street Journal (WSJ) portion of Penn Treebank. See, for example, Michael Collins in "Three Generative, Lexicalised Models for Statistical Parsing. Proceedings of the 35th Annual Meeting of the ACL jointly with the 8th Conference of the EACL)," Madrid, 1997, Ratnaparkhi in "Maximum Entropy Models for Natural Language Ambiguity Resolution," Ph.D. thesis, University of Pennsylvania, 1998, Collins in "Head-Driven Statistical Models for Natural Language Parsing," Computational Linguistics, 2003, Klein et al. in "Accurate Unlexicalized Parsing," Proceedings of 41st Annual Meeting of Association for Computational Linguistics, 2003, and Bod in "An Efficient Implementation of a New DOP Model," Proceedings EACL'03, Budapest, Hungary, 2003. In named entity (NE) recognition, as driven by DARPA information extraction programs, seven named entity categories have been proposed, i.e., person, organization, location, time, date, money, and percent, have been proposed. See Chinchor, "Overview of MUC7/MET-2", In Proceedings of the Seventh Message Understanding Conference (MUC7) 1998. Other researchers continued this direction of work but with only four named entity (NE) types, e.g., person, organization, location, and miscellaneous. See, for example, De Meulder, "Memory-based Named Entity Recognition using Unannotated Data", In Proceedings of CoNLL-2003, Edmnonton, Canada.

For the past decade, understanding aspects of spoken languages, such as using prosody for disfluencies and sentence boundaries, has also received a great deal of attention. See, for example, Shriberg "Preliminaries to a Theory of Speech Disfluencies" PhD thesis, University of California at Berkeley, 1994, Heeman, "Detecting and Correcting Speech Repairs", Association for Computational Linguistics", Las Cruces, N. Mex., 1994, Shriberg et al., "Prosody modeling for automatic speech understanding: an overview of recent research at SRI," in Proc. ISCA Workshop on Speech Recognition and Understanding, pp. 13 to 16, 2001, Charniak, "Edit Detection and Parsing for Transcribed Speech", Proceedings of the 2nd Meeting of the North American Chapter of the Association for Computational Linguistics, pp 118 to 126, 2001.

Recently, statistical approaches have started to obtain more attention in the study of spoken language understanding. See, for example, He, "Robustness Issues in a Data-Driven Spoken Language Understanding System" HLT-NAACL 2004 Workshop on Spoken Language Understanding for Conversational Systems and Higher Level Linguistic Information for Speech Processing. Boston, USA, and Wutiwiwatchai et al., "Hybrid Statistical and Structural Semantic Modeling for Thai Multi-Stage Spoken Language Understanding" HLT-NAACL 2004 Workshop on Spoken Language Understanding for Conversational Systems and Higher Level Linguistic Information for Speech Processing. Boston, USA. Here, the approaches advocated by He and Wutiwiatchai et al. use a multi-stage understanding strategy, which is a strategy computational linguists attempted before, such as, for example, the strategies discussed by Frazier et al. "The Sausage Machine: A New Two-Stage Parsing Model", Cognition, Volume 6, pp. 291 to 325, 1978, and Abney, "Parsing By Chunks", In: Robert Berwick, Steven Abney and Carol Tenny (eds.), Principle-Based Parsing, Kluwer Academic Publishers, Dordrecht, 1991. (Frazier and Fodor 1978; Abney 1991). The approaches proposed by He and Wutiwiatchai et al., however, put an emphasis on modeling the spoken language modeling with statistical process. In particular, such approaches decompose the spoken language processing into speech recognition, semantic parsing and dialog act decoding. The semantic parser models and identifies domain semantic chunks using push-down automata with probabilistic moves, and the dialog decoder finds a dialog act based on the set of semantic concepts identified by the semantic parser with an extended naïve Bayesian algorithm.

Wutiwiatchai et al. discuss a three-stage approach, in which the first stage extracts predefined concepts from an input utterance using a weighted finite state transducer. See also, Riley et al. "Tranducer composition for context-dependent network expansion," Proc. Eurospeech '97, Rhodes, Greece, September 1997. This three-stage approach is similar to the statistical parsing approach Nuance has taken, and the primary difference is in weighting different hypotheses. In the second stage, the goal or dialog act of the utterance is identified by a multi-layer neural network. The third stage converts the identified concept word strings into concept values.

Another line of research in spoken language understanding is directed at single level semantic classification. Pioneer work in this direction includes the AT&T HMIHY system, as discussed, for example, in Gorin, et al., "HOW MAY I HELP YOU?", Speech Communication, vol. 23, pp. 113 to 127, 1997, and Haffner, et al., "Optimizing SVMs for complex Call Classification" In ICASSP '2003. The single level semantic classification approach is considered to be robust against noises at acoustic and semantic levels. However, the approach only provides flat semantic categories for an input, which may be adequate for limited applications, such as directory assistance, but may be too constrained for general in-depth dialog applications.

SUMMARY OF THE INVENTION

An exemplary embodiment and/or exemplary method of the present invention may simultaneously address the issues of data sparseness and overfitting by incorporating a model prior during feature selection and optimization. Moreover, rather than simply finding the best constant mean and variance for all the parameters in Guassian priors, an exemplary embodiment and/or exemplary method of the present invention may find the best variable means and variances for individual parameter in Gaussian priors. The exemplary embodiment and/or exemplary method of the present invention may be applied, for example, in language understanding modules of conversational dialog systems.

The present invention provides improvements to a language understanding module of a spoken dialog system to address issues of limited language usages, shallow understanding, and miscommunication of a spoken dialog system, for application where users may be cognitively overloaded, and where shortened phrases, disfluencies, and anaphora are common, and the misrecognition of conversational dialogs by the speech recognizer cannot be avoided.

An exemplary embodiment and/or exemplary method of the present invention may provide improvements to a spoken language understanding module for use in spoken dialog systems. In particular, various statistical modeling methods are assessed herein for application in spoken language understanding, including robust methods for conditional maximum entropy modeling, which were studied for parsing, named entity tagging, and topic classification. Exemplary methods that included Gaussian priors and/or feature selections were assessed and compared for dealing with data sparseness and over-fitting issues. An improvement was observed by using feature selection and Gaussian priors together. In regards to problems in recognizing partial proper names, an exemplary method and/or exemplary embodiment of the present invention may cut error rates by 50%. To handle the scenario where a deep parser does not return a complete answer, an exemplary topic classifier that uses structural information was used at all times for parsing. Experiments were conducted for an exemplary language understanding module, a task completion rate of 80% in MP3 domain was observed.

BRIEF DESCRIPTION OF THE DRAWINGS

FIG. 7 shows a comparison of test results among five different combinations of the use or non-use of the selective gain computation (SGC) method and/or Gaussian priors to select features in the context of a MP3 training data set.

FIG. 8 shows a comparison of test results among five different combinations of the use or non-use of the selective gain computation (SGC) method and/or Gaussian priors to select features in the context of sections 02-21 of the Wall Street Journal (WSJ) data set.

FIG. 10 shows the effect when the Gaussian priors are estimated with different amount of training data after the feature selection is performed.

DETAILED DESCRIPTION

Introduction

The present invention address the issues of limited language usages, shallow understanding, and robustness in spoken dialog system for operating audio systems, such as, for example, an MP3 player. In particular, the present invention provides an improved language understanding module of a spoken dialog system, where users may be cognitively overloaded, where phrase fragments, disfluencies, and anaphora may be common, where the miscommunication in conversational dialogs by the dialog systems cannot be avoided, and where deep understanding is required for fixing miscommunication. In this regard, the improvements provided by the present invention may be applied, for example, in a MP3 domain, where song or album names can be anything ranging from repetitive words, phrases, to sentences.

Below, an overview of an exemplary spoken language understanding module is provided, as well as exemplary methods for use in the exemplary spoken language module, including, for example, an exemplary method for partial proper name recognition, a dependency parser, exemplary model training and smoothing methods, and a topic classifier, and an exemplary interaction of the topic classifier with an exemplary speech recognition module and an exemplary dialog module. Experimental results are also provided.

Modeling Language Understanding for Dialog Systems

It has been observed that the language people use for interacting with a dialog system is different from that which is used in written language. Even within spoken language, the planned speech is different from spontaneous speech as demonstrated in various HUB programs. See, for example, Pallet et al., "Broadcast News Benchmark Test Results: English and Non-English", Proceedings of the DARPA Broadcast News Transcription and Understanding Workshop. Lansdowne, Va., 1998. Here, it is hypothesized that for cognitively overloaded users, instances of phrase fragments, difluencies, and anaphora are common in interactions with the dialog system. For example, the "Wizard of Oz" data collection in operating an extended MP3 music player, involving various query and control functions, in a driving scenario provides initial evidences of such instances. See Cheng et al., "A Wizard of Oz Framework for Collecting Spoken Human-Computer Dialogs" In INTERSPEECH-2004.

Dealing with rich spoken language may require a deep understanding of each utterance, which may be complex, disfluent, or fragmented. Given the nature of certain kinds of utterances, key word spotting and rule-based approaches may not fit well. Instead, a robust but deep language understanding framework with statistical methods may be required.

Figure 1A:
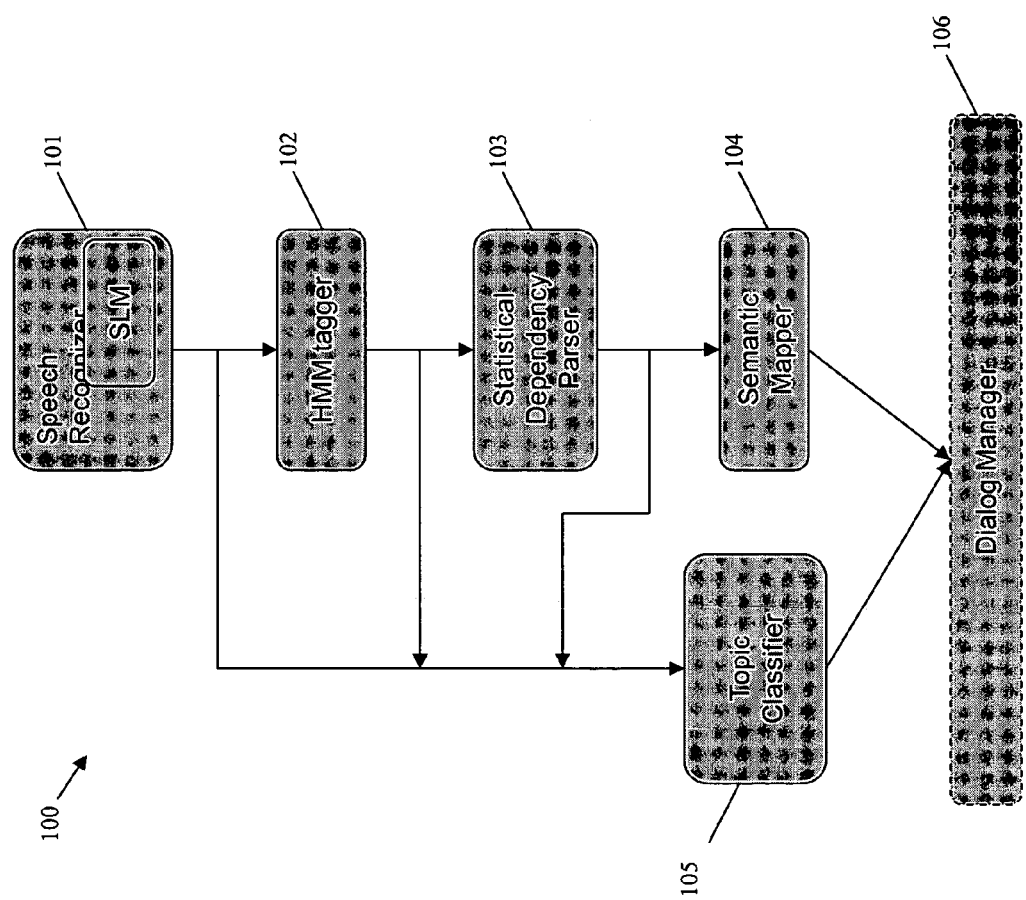
FIG. 1A shows an exemplary spoken language understanding module arrangement according to the present invention.

FIG. 1A shows an exemplary spoken language understanding module arrangement 100, which includes a speech recognizer 101, a part of speech (POS) tagger 102, a statistical dependency parser 103, a semantic mapper 104, a topic classifier 105, and a dialog manager 106.

Class-based ngram models may be used in the speech recognizer 101, where classes are names for songs, albums, playlists, music genres and artists in MP3 domain. A named class is defined by either a list of names, or a ngram model trained from the names in that class. The ngram model is used for a class to allow name fragments, which may be useful for instances when names contain many words which are hard for user to remember exactly. The exemplary spoken language understanding module arrangement 100 may be suitable for dealing with phrase fragments, especially, partial proper names. The exemplary spoken language understanding module arrangement 100 may also be applied to other domains with richnames, such as book ordering.

The output from the speech recognizer 101 feeds to a part-of-speech (POS) tagger 102 that uses Hidden Markov Model (HMM) with tag ngram as the transition probability and conditional word probability given a tag as the state emission probability. In this regard, the part-of-speech (POS) tag set provided in Penn TreeBank from Linguistic Data Consortium (LDC) may be adopted.

The n-best tagged sequences are, in turn, sent to the statistical dependency parser 103, which produces the dependency structures for the input sentences. It may not always be the case that the dependency parser 103 produces one or more complete dependency structures for an input sentence. When the parser 103 is unable to produce a complete dependency parse, it will return best scored parse forests with multiple dependency structures.

The results from the dependency parser 103 are provided to the semantic mapper 104, which reveals the grammatical relations among the head words and to various grammatical features, such as tense, mood, aspect, and speech acts. The mapping is based on linguistic knowledge represented in rules or patterns.

On a parallel path, the topic classifier 105 takes the part-of-speech (POS) tagged word sequence and its dependency structure, and classifies the sequence into one or more semantic topic categories. For example, more than 20 semantic categories may be defined for the current domain. A conditional entropy modeling method, similar to that discussed in Zhou et al., "A Fast Algorithm for Feature Selection in Conditional Maximum Entropy Modeling", In Proceedings of EMNLP 2003, Sapporo, Japan, may be used for the classification. The topic classifier 105 provides a fallback solution to the dialog manager 106.

With this exemplary spoken language understanding module arrangement 100 and a speech recognizer of close to 90% word recognition accuracy, an exemplary dialog system according to the present invention may achieve a task completion rate of 80% on a test data set of 1600 sentences from 23 subjects in the MP3 domain. About 300 single word sentences have been removed from this data set due to the non-existence of the dependency relation for any single words.

The exemplary spoken language understanding module arrangement 100 may use, for example, Hidden Markov Model (HMM), fragmented name phrases and partial proper names, modeling dependency relations, and smoothing approaches in the model training process, as further discussed below.

Partial Proper Name Recognition

If the speech recognizer 101 for the exemplary dialog system does not produce class labels for the class-based statistical language models, a two stage approach may be provided for obtaining proper names. In the first stage, the proper name identification is treated as a tagging problem. In the second stage, based on name databases, a boundary-correction method is used to correct boundary errors from the first stage. Even if the class labels are provided by any speech recognizer with ngram language models, the label boundaries are essentially based on ngram information and there may still be a need for possible boundary-correction. While the purpose of the boundary-correction method may be similar in some respects to the transformation-based method discussed by Brill, "Transformation-Based Error-Driven Parsing", 3rd International Workshop on Parsing Technologies. SIG-PARSE 1993, an exemplary difference being that an exemplary method of the present invention relies on the use of the external proper name information and possible error combinations.

An exemplary method for proper or partial proper name recognition includes a memory-based learning method and/or maximum entropy based method combined with a boundary correction method, as described below.

The Memory-Based Method

Named entity (NE) recognition may be considered as a classification problem. One example of a classification method is a memory-based learning method discussed by De Meulder et a., "Memory-based Named Entity Recognition using Unannotated Data", In Proceedings of CoNLL-2003, Edmonton, Canada, which was used to perform experiments described herein, and therefore is referred to as the baseline classifier. In the exemplary memory-based method, instances are represented with features and each feature is assigned a weight based on its contribution to the classification accuracy in the training data. During the training stage, the memory-based algorithm stores all training instances in the form of features, and classifies new instances by comparing them with the training instances. A new instance will receive the same class as those training instances that are most similar to the new instance according to some predefined similarity metric. A memory-based learning package that may be used is Timbl, which is discussed, for example, by Daelemans, "TIMBL: Tilburg Memory-Based Learner Version 4.0 Reference Guide", 2001. For experiments, the default settings of Timbl may be used, for example, and the information gain may be used as the feature weighting and an overlap metric may be used as the similarity measure.

The purpose of the classifier 105 is to label each token with either a proper named entity (NE) category or a non-NE category. Here, only two named entity (NE) categories are considered in the setting of spoken language understanding for the domain of operating MP3 player: song names and album names. This is because the two categories may be difficult to deal with since any word, phrase, or sentence may be potentially be part of a song or album name.

The tag set used for the classifier includes three types of tags: "I", "O", and "B" tags, where "I" indicates that a word is inside a named entity (NE) category, "O" indicates that a word is a non NE category, and "B" indicates the beginning or start of a new named entity (NE) category immediately after a NE of the same category.

The input features to the memory-based classifier consist of the current word or part-of-speech (POS) tag and its left context (including words, part-of-speech (POS) tags and identified NE tags) with a window size of 3, so altogether 10 features. Since features used frequently in normal named entity (NE) tasks, such as affix and orthographic information, do not occur in spoken language, they are not considered here. The feature representation for each word and its corresponding named entity (NE) category will be stored in training procedure. For a new input sentence with part-of-speech (POS) tags, each word is represented by the above ten dimensional features and assigned the same category as that of its nearest neighbor in the training set.

The Maximum Entropy method

Maximum Entropy based methods have been used in a number of works reported in the annual Conference on Computational Natural Language Leaning (CoNLL), including, for example, the work of De Meulder, "Memory-based Named Entity Recognition using Unannotated Data", In Proceedings of CoNLL-2003, Edmonton, Canada. Here, the ME-based methods treat proper name recognition as a tagging problem, and use maximum entropy modeling to estimate the conditional probability of the IOB tag of the current word, given its history. Using the chain rule, the best IOB tag sequence is computed as:

$$\hat{E}_1^n = \underset{E_1^n}{\operatorname{argmax}} \{P(E_1^n | W_1^n, T_1^n)\}$$

where $$P(E_1^n | W_1^n, T_1^n) = \prod_i P(E_i | E_1^{i-1} W_1^i, T_1^i),$$

$E_l^n$, $W_l^n$, and $T_l^n$ are the IOB tag, word, and part-of-speech (POS) tag sequences, respectively.

Since it is not always possible to model the whole past history, the left three words and their tags are used as the history. If "x" is used for history and "y" is used for IOB tags, the conditional maximum entropy modeling may be computed as determined with the following formula:

$$p(y|x) = \frac{1}{Z(x)} \exp\left\{\sum_j \lambda_j f_j(x, y)\right\}$$

where $$Z(x) = \sum_y \exp\left\{\sum_j \lambda_j f_j(x, y)\right\}$$

is a normalization factor.

To train the conditional maximum entropy model, the selective gain computation (SGC) method may be used for feature selection and parameter estimation, which is described, for example, in U.S. patent application Ser. No. 10/613,366, entitled "A Fast Feature Selection Method and System for Maximum Entropy Modeling", which was filed Jul. 3, 2003, and by Zhou et al., "A Fast Algorithm for Feature Selection in Conditional Maximum Entropy Modeling", In Proceedings of EMNLP 2003, Sapporo, Japan, the disclosures of which are incorporated by reference herein in their entirety. As discussed therein, the conditional maximum entropy estimated probability is computed or determined using fast feature selection. A set of feature templates may be provided for the training. In particular, word, part-of-speech (POS) tag, and IOB tag of the left three positions, as well as word and tag information of the current position, may be used in combination in the templates.

The Boundary Correction Method

The tagging results that are returned by the baseline tagging methods, such as the memory-based learning method and the maximum entropy (ME) based method, may contain errors at the boundaries of proper names. For example, in the sentence "I want to listen to the album that love tomorrow is on" the member words of song name "love tomorrow" may be incorrectly tagged as love/I-SONGNAME tomorrow/O, instead of the correct one: love/I-SONGNAME tomorrow/I-SONGNAME. To recognize partial proper names may be even more challenging. In various practical applications, especially in spoken language applications, people may use only partial names instead of full names when the names are long. In both baseline tagging methods, the context used is longer than the 3 gram language model for the speech recognizer 101. It may be reasonable to assume that similar boundary errors may also occur when class labels are provided by any ngram speech recognizer that adopts a memory-based learning method.

Since in certain applications, proper names are known to the system (e.g., as part of a data-base), such information may be used to identify both full and partial proper names together. In this regard, the proper names recognized by the baseline methods may be checked against a given name database and the ones in the database that match well with the recognized names are used to correct potential errors in the recognized names, especially at the boundaries of the recognized names.

Given a recognized partial name, an exemplary boundary correction method according to the present invention determines potential ways to correct the boundary mistakes with certain ordering constraints incorporated. The exemplary boundary correction method may involve the following five steps. For better understanding of the exemplary boundary correction method, a concrete example is provided: Consider a sentence "WABCD", in which each character represents a word and where "ABCD" is a partial song name and W is outside of that name. If the proper name is incorrectly tagged as "W/I-SONGNAME A/I-SONGNAME B/I-SONGNAME C/I-SONGNAME D/O" by the baseline classifier, the exemplary boundary correction method may use WABC to search the database and eventually to remove W from this song name and recognize D as a part of this name.

Figure 1B:
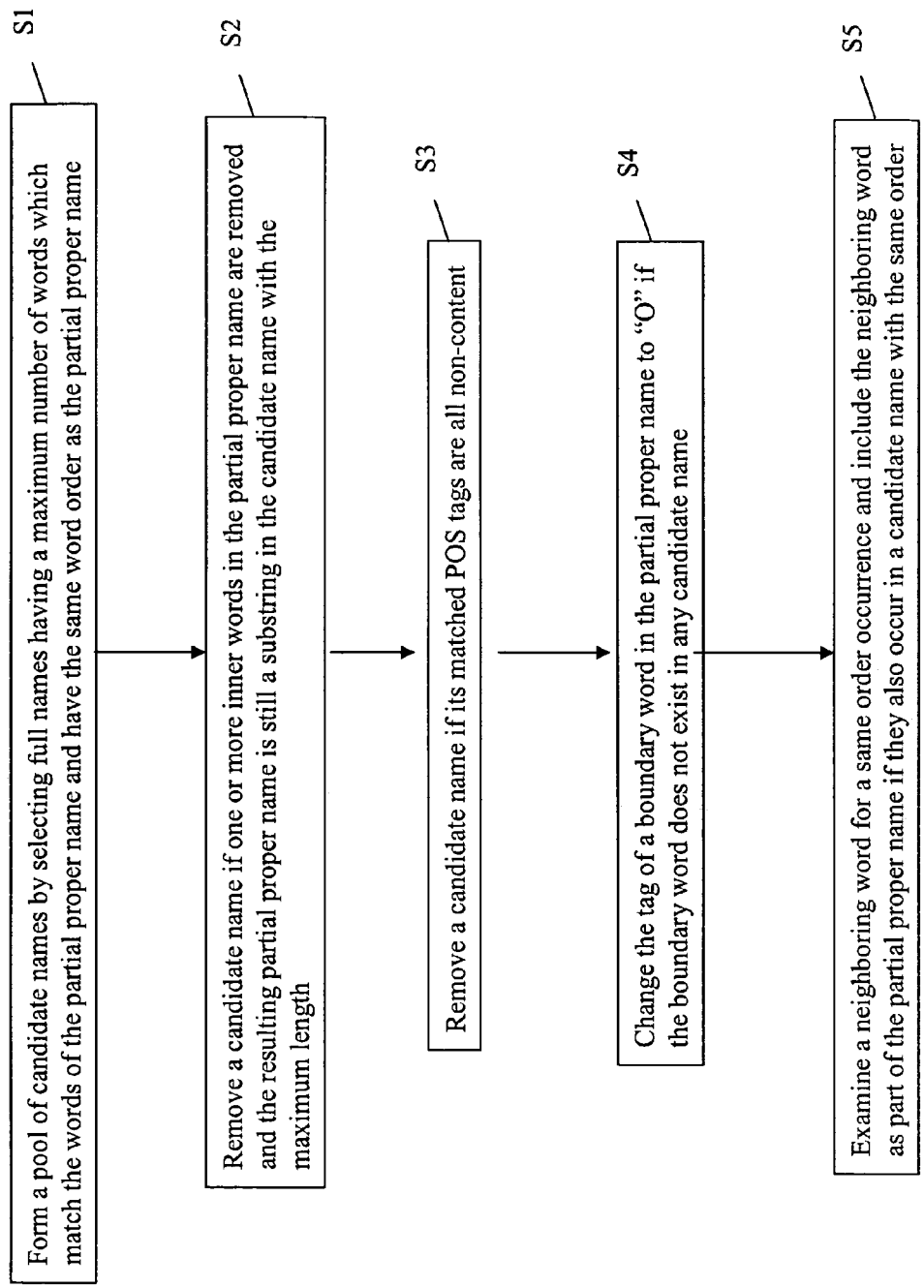
FIG. 1B shows an exemplary boundary correction method for providing proper or partial proper name recognition.

FIG. 1B shows an exemplary boundary correction method 100 according to the exemplary method of the present invention. Given a recognized partial proper name, the exemplary boundary correction method 100 includes the following operations or steps:

In step S1, a pool of candidate names is formed by selecting from a full name database those full names that have the maximum number of words occurring in the partial name and in which the order of the matched words is the same as that of the partial name. In the above example of partial name WABC, the system may select, for example, ABCDE, WABE and WACE, because all of the three names have three words in common with WABC and the three words are in the same order as the corresponding ones in the partial proper name.

In step S2, if one or more inner words in the partial proper name are removed and the resulting partial proper name is still a substring in the full name with the maximum length, then the full name is removed from the candidate pool. For example, given the partial name WABC and a full name WACE, removing B in the partial name leads to a subsequence WAC, which is the maximum subsequence in the full name WACE. Therefore, the full name WACE is removed. That is, non-boundary insertion is not allowed for the partial name.

In step S3, unless all the POS tags in the full name are non-content words, a candidate name is removed from the pool if its matched POS tags are all non-content. This is because if there is a content word, it may be more likely that it would occur in the partial name.

In step S4, if a boundary word in the partial name does not exist in the full name pool, the system changes its tag from proper name category to 'O'. Otherwise, it is kept unchanged. In the above example, if W is not in the full name, the tag for W will be changed to 'O', and consequently, WABC will be tagged as W/O A/I-songname B/I-songname C/I-songname.

In step S5, the neighboring words of the partial proper name in the sentence are examined to determine whether they can be part of the proper name. If a neighboring word occurs in a full name and with the same order, it is assigned to the same proper name category. For example, if the right neighboring word of ABC is D which occurs in the full name ABCDE, in the final step of the exemplary boundary correction method, sentence WABCD is correctly tagged as W/O A/I-songname B/I-songname C/I-songname D/I-songname.

Experiments

A set of experiments was performed to assess the effectiveness of the exemplary boundary correction method. Operating MP3 players were selected as the test domain and highly complicated song names and album names as the categories for testing the method. Simulated training and testing data sets by permuting all the song and album names were used due to the lack of real data. Compared with the memory-based method and ME-based method, the addition of an exemplary boundary-correction method cuts the error rates in half.

The Wall Street Journal (WSJ) tag set was used as the Part of Speech (POS) tag set and more than 700 template sentences in the domain of operating a MP3 player were collected. A template sentence is a sentence with proper names replaced with their class tags. So, in the MP3 domain, songname is used as the class tag for all the song names, albumname is used as the class tag for album names, and so on. These two categories were focused on because they are believed to be more dynamic and complex than the artist names and genre names. In addition to the template sentences, about 300 song names and about 30 album names were used in the experiments. The partial proper names were derived by removing the non-content words in the names. For the song names, the average length of the full names is 3, while the average length of the partial names is 1.88. 63% of the partial song names are different from their full name counterpart. For the album names, the average length of the full names is 2.68, while the average length of the partial name is 1.93. 54% of partial album names are different from their full name counterpart. These song and album names are permuted in the template sentences to generate 28577 synthesized sentences in the experiments.

The first set of experiments demonstrates the effect of different amounts of training and testing data. The 700 template sentences were divided into 4 subsets, 8 subsets, and 10 subsets. In the case of 4 subsets, for each experiment, 3 subsets were used as the training data, and the other subset was used as the test data. In this manner, each subset was used as a test set once, and in total, four experiments were conducted. The results in the case of 4 subsets are summarized in FIG. 2. It is similar for cases when there are 8 subsets and 10 subsets, and their results are provided in FIGS. 3 and 4, respectively. To see the effect of the exemplary boundary correction method, the same song name and album name sets are used for generating both training and testing data. The only difference between the names (song and album) used for training and the names for testing is that non-content words in the names were removed to "fake" partial proper names for the test data. For that reason, the same set of experiments were conducted without step S3 in the exemplary boundary correction method. The generation of the training and test data sets may not be required if a sufficiently large amount of real training and testing data are available.

Figure 2:
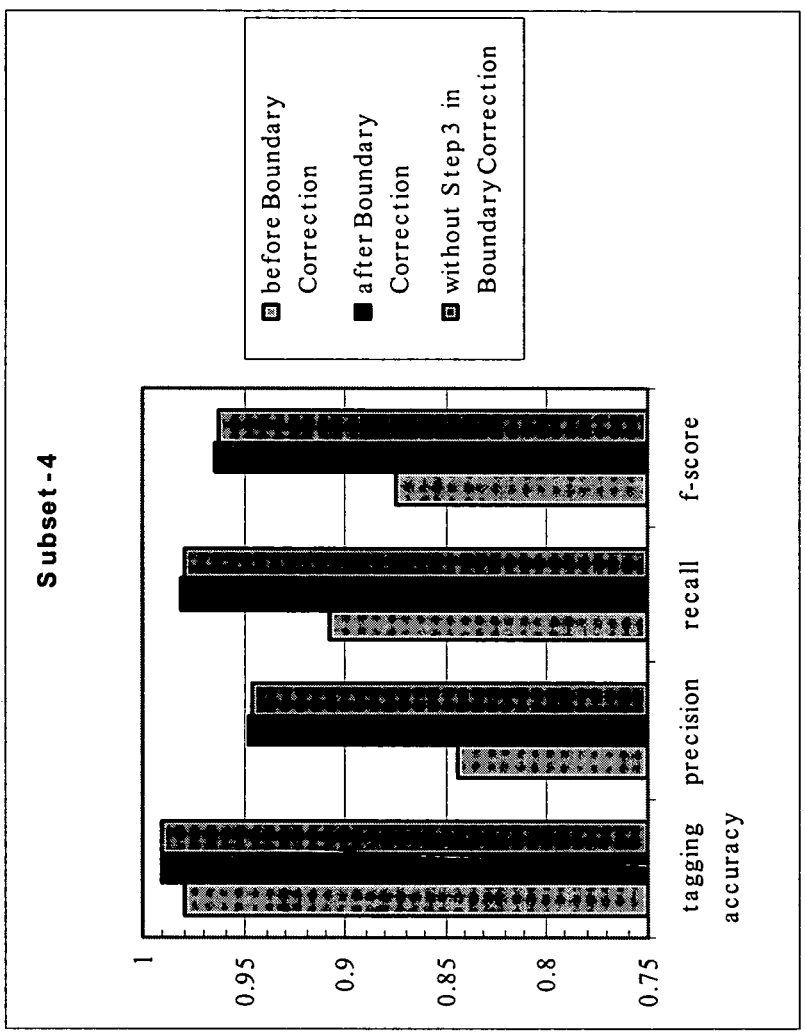
FIG. 2 shows exemplary average test results for a subset-4 using the memory-based learning method before and after an exemplary boundary correction method was added.

In the case of a 4-fold partition, the sizes of the training sets are between 19757 sentences (171990 words) to 23292 sentences (198799 words), and the size of the test sets are between 5285 sentences (41131 words) and 8820 sentences (63362 words). For the experiments, IOB tagging accuracy, the recall, precision and f-score of the proper name recognition are determined or computed. The results of the 4 tests are averaged based on the sizes of the 4 test sets. FIG. 2 shows that the tagging accuracy reaches 98% for the memory-based method, and with the addition of the exemplary boundary correction method, the combined method reaches 99%. The improvement of the numbers for precision, recall and subsequently f-score are more drastic with the addition of the exemplary boundary correction method. Precision improves from 84.33% to 94.92%, recall improves from 90.81% to 98.16%, and f-score improves from 87.45% to 96.51%. In other words, the addition of the exemplary boundary correction method cuts the error rates by more than 50% in all the cases. Also, the numbers without step S3 in the exemplary boundary correction method maintain a high level of performance with only a slight degradation.

Figure 3:
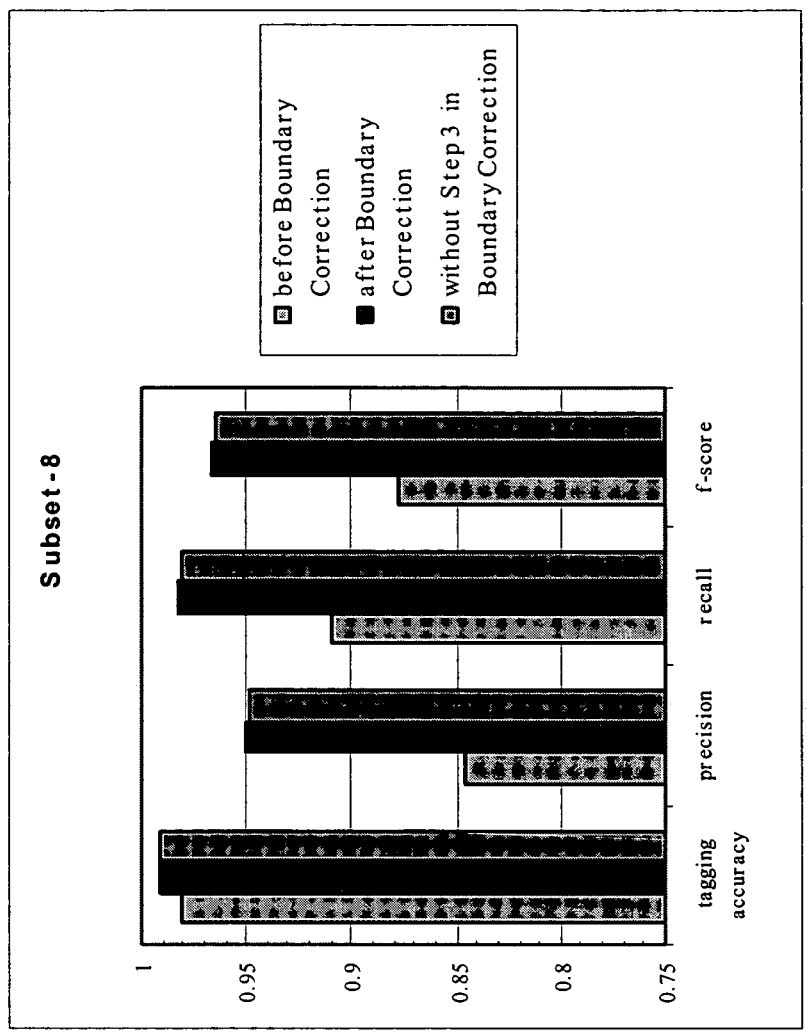
FIG. 3 shows exemplary average test results for a subset-8 using the memory-based learning method before and after an exemplary boundary correction method was added.
Figure 4:
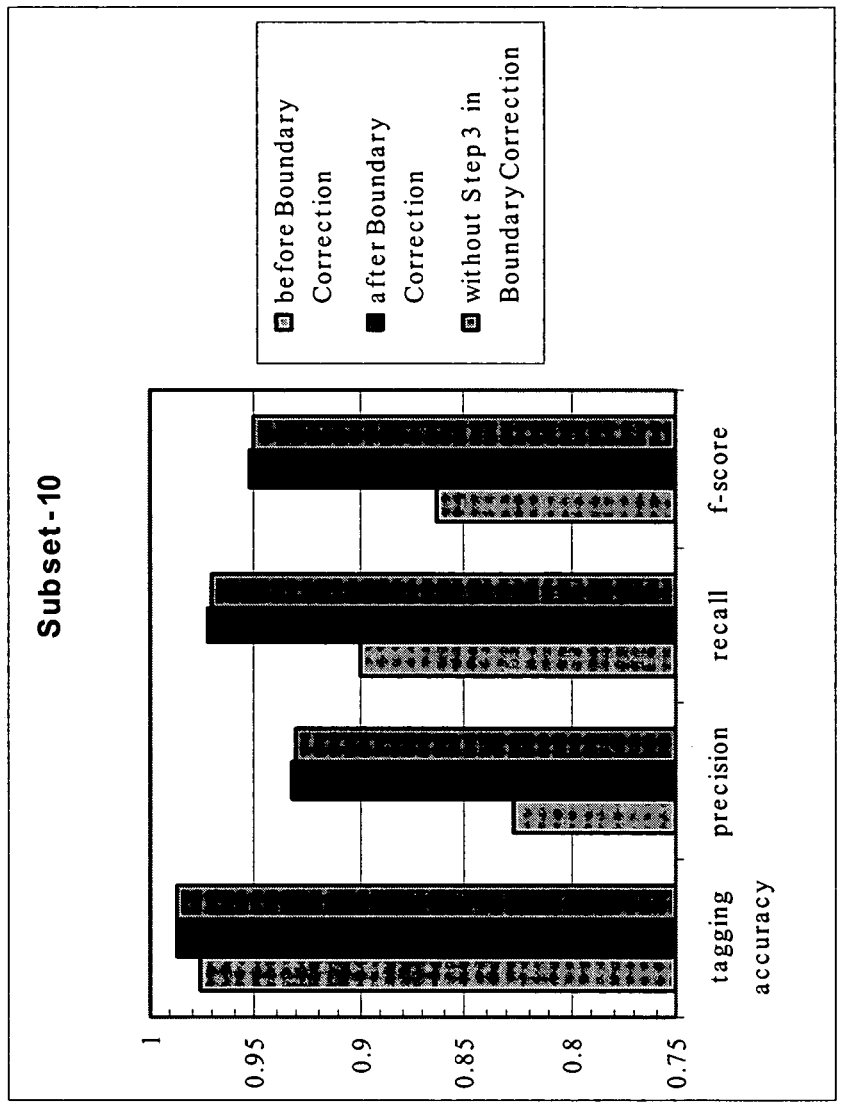
FIG. 4 shows exemplary average test results for a subset-10 using the memory-based learning method before and after an exemplary boundary correction method was added.

The results from 8-subsets and 10-subsets show similar patterns as the case of 4-subsets (see, for example, FIGS. 3 and 4). However, the results from the 8-subsets are better than the ones from 4-subsets. This may be the result of using more training data in the experiments.

Figure 5:
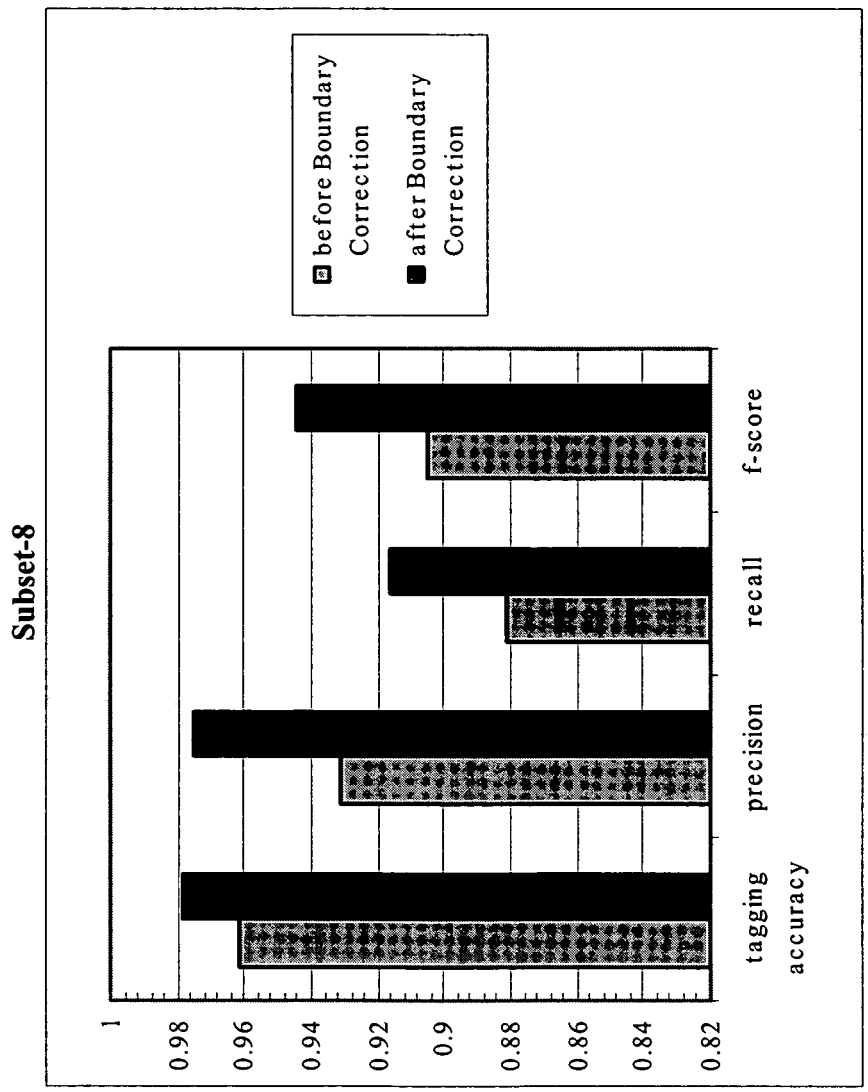
FIG. 5 shows exemplary average test results for a subset-8 using the maximum entropy based method before and after an exemplary boundary correction method was added.

To determine whether the exemplary boundary correction method has added values to other methods for partial proper name recognition, another set of experiments was conducted with the maximum entropy based method. Similarly, 8-subsets were used for the experiments, in round-robin fashion. The results are averaged across 8 different test sets. The performance of the maximum entropy based method combined with the exemplary boundary-correction method may be somewhat less than if the exemplary boundary correction method were combined with the memory based baseline approach. This may be partly because we used 6 subsets as the training data, one subset as the development set, and the last subset as the test set, which implies that one less subset was used for training. However, as demonstrated, the tagging accuracy, the precision and recall, and the f-score, improved significantly, with almost all the error rates again cut by more than 50%. The results are shown in FIG. 5.

Figure 6:
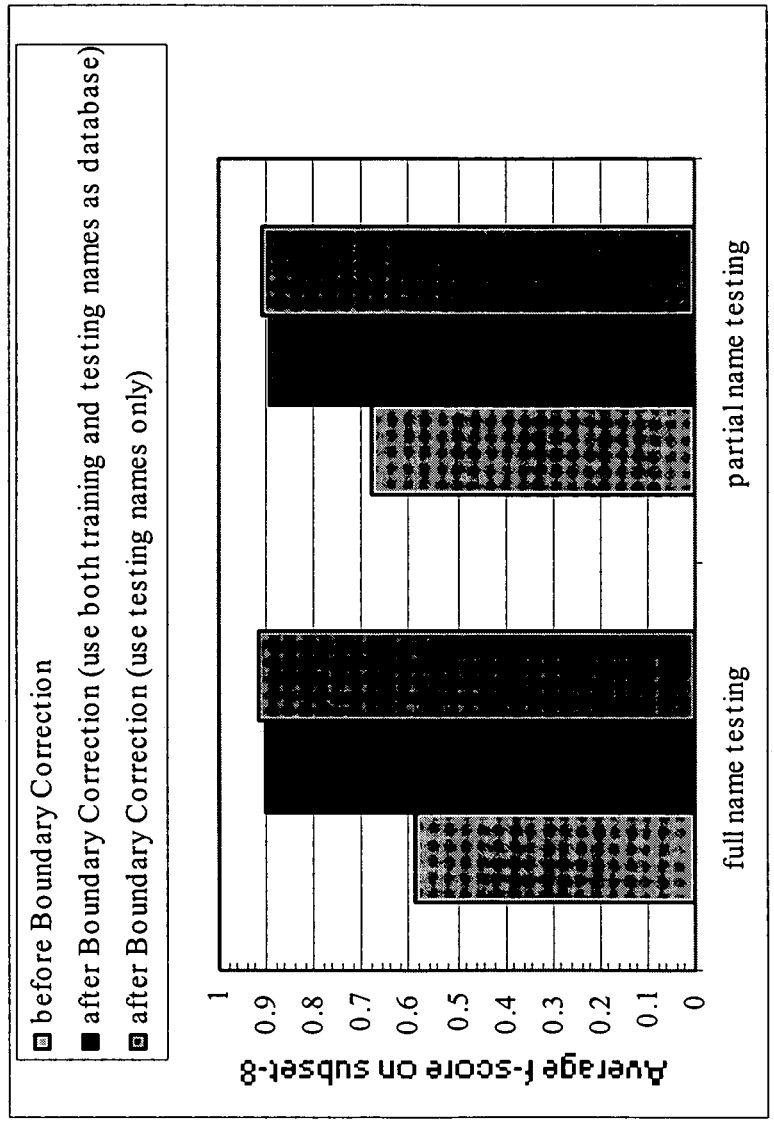
FIG. 6 shows exemplary test results on separate training and testing names.

One last set of experiments was performed to see the effect if the proper name list in the test data is not included in the training data. The memory-based baseline may have the undesired feature of not having access to the proper name list. However, in practice, a model may be trained and packaged, and the available proper name list may not be integrated into the model in real time. So about 20% of both song names and album names may be randomly selected as testing names, and the rest are used as training names. They were permuted in the template sentences separately. Experiments were performed on both full testing names and partial testing names using 8 subsets. The effect of using training names as part of the database in the exemplary boundary correction method in testing was also examined. As can be seen from FIG. 6, the results with and without the boundary-correction method have once again show a significant improvement with the error rates cut by more than half, and the result with training names in the test name list under-performed slightly than the one without training names in the test name list. This may be due to the interference of the training names to the testing names.

Also, the exemplary boundary-correction method may improve both recall and precision by a large amount, which is in contrast with the results reported by Andrei Mikheev, Claire Grover, and Marc Moens, in Description of the LTG System Used for MUC-7, Proceedings of MUC-7, 1998, where the addition of new steps in the pipeline of proper name recognition may have improved the recall but degraded the precision.

Error analysis was performed on the tagging results by applying both the memory-based method and the exemplary boundary-correction method with the 4-subsets and with the same song/album name lists for both training and testing. This is because all different subsets have similar tagging accuracies, and the 4-subsets have the biggest test data set with a total of 1983 errors.

About 67% of all errors were caused by the confusion between partial proper names and the regular words that are in the name database and also occur in locations where the proper names may occur. In the example "Play/O the/O song/O now/I-songname", "now" is labeled as part of a proper name in "here and now". However, in the test set, it is labeled as a normal temporal word.

Another set of errors was caused by the confusion between song names and album names. This accounts for about 16.6% of the errors. An album name may take the name of one of the song names in the album. While some examples show that there are indeed confusable instances such as "Play/O slave/I-songname love/I-songname", other examples show that contextual clues or long distance dependency may help in reducing this type of error. For example, "Does/O this/O album/O have/O made/I-albumname England/I-albumname" may be correctable.

The above two types of errors happen at the baseline system, i.e., the memory-based method. The third and last major set of errors was caused by the exemplary boundary-correction method. The exemplary boundary-correction method occasionally over-corrects boundary words when the boundary words of a partial proper name happen to be part of the corresponding full proper name. For example, the utterance "Does this album have nothing" was correctly tagged by the memory-based method as "Does/O this/O album/O have/O nothing/I-songname". However, it was over-corrected by the exemplary boundary-correction method as "Does/O this/O album/O have/I-songname nothing/I-songname" since there is a song name "have nothing" in the song name list. This type of errors accounts for 9.2%.

In summary, the three major types of errors account for a little more than 93% of the total errors. Besides the task differences, the way of using the proper name database may also have significant effect on the performance results. The work reported in Conference on Computational Natural Language Learning (CoNLL) uses features derived from the proper name lists, while in this work heuristics are used for matching.

Modeling Dependency Relations

The parsing process identifies structural and functional relations, such as subject, predicate, and object, among words in a sentence, and it is a key step in natural language understanding and may significantly impact the performance of an entire language dialog system. An exemplary statistical dependency parser 103 according to the present invention may provide improved robustness and accuracy. In this regard, the modeling of dependency relations may include two main processes: a training process and a parsing process, which are described below, as well some experiments to demonstrate their effectiveness.

Probabilistic Model Decomposition

An exemplary trainer is provided to build a probabilistic model, which is used by the statistical dependency parser 103 during run time. The probabilistic model models the entire set of dependency relations for a single sentence, which may be decomposed via the following steps.

Let's denote $\overline{L}_{i,j}$ as the parsed dependency covering the region between word i and word j, and $L_{i,j}$ is a triple of $(l_{i,j}, w^{i,k}, w^{i+1,j})$ where $l_{i,j}$ is the last dependency relation that connects its two head words $w^{i,k}$ and $w^{k+1,j}$ representing the two sub-regions (i,k) and (k+1,j) to be unified. $w^{i,k}$ and $w^{k+1,j}$ can also be two sets of features characterize the two corresponding sub-regions.

$$P(\overline{L}_{i,j}) = P(L_{i,j}, \overline{L}_{i,k}, \overline{L}_{k+1,j})$$
$$= P(L_{i,j}|\overline{L}_{i,k}, \overline{L}_{k+1,j}) * P(\overline{L}_{i,k}, L_{k+1,j})$$
$$= P(L_{i,j}|\overline{L}_{i,k}, L_{k+1,j}) * P(\overline{L}_{i,k}) * P(\overline{L}_{k+1,j}) * e^{MI(\overline{L}_{i,k}, \overline{L}_{k+1,j})}$$

That is:

$$P(\overline{L}_{i,j}) = P(\overline{L}_{i,k}) * P(\overline{L}_{k+1,j}) * P(L_{i,j}|\overline{L}_{i,k}\overline{L}_{k+1,j}) * e^{MI(\overline{L}_{i,k}, \overline{L}_{k+1,j})} \quad (1)$$

Intuitively, the probability for the large region (i,j) is computed through its two sub-regions, i.e. (i,k) and (k+1, j), and the last dependency relation, with an adjustment of a mutual information that characterizes the redundant information between the top dependency relation and its two sub-components. The two sub-regions are decomposed iteratively until they reach leaf nodes.

During the parsing process, the parser 103 systematically searches through all the legitimate pairs of head words bottom-up using a chart parsing technique, described, for example, by Weng at al., "A Novel Probabilistic Model for Link Unification Grammar", In the Proceedings of the 7-th International Workshop on Parsing Technologies, sponsored by Association of Computational Linguistics/SIGPARSE, Beijing, 2001. At each step in the search, the parser 103 computes the probabilistic scores for each legitimate pair based on the dependency model in equation (1) and keeps the best candidates for each region. The parser 103 may identify, for example, about 30 functional relations, such as subject, predicate, and object, among different words in a sentence.

Model Training Methods

The two probability components in equation (1) are estimated using different procedures during the training. The conditional probability component $P(L_{i,j}|\overline{L}_{i,k},\overline{L}_{k+1,j})$ is estimated through conditional maximum entropy approach, which is described, for example, by Ronald Rosenfeld, "Adaptive Statistical Language Modeling: A Maximum Entropy Approach", Ph.D. thesis, Carnegie Mellon University, April, 1994, and by Berger et al., "A Maximum Entropy Approach to Natural Language Processing", Computational Linguistic, 22 (1): 39-71, 1996. A selective gain computation (SGC) method is used to speed up the training process as well as to overcome data over-fitting. An exemplary selective gain computation (SGC) method is described, for example, in U.S. patent application Ser. No. 10/613,366, entitled "A Fast Feature Selection Method and System for Maximum Entropy Modeling", which was filed Jul. 3, 2003, and by Zhou et al., "A Fast Algorithm for Feature Selection in Conditional Maximum Entropy Modeling", In Proceedings of EMNLP 2003, Sapporo, Japan, the disclosures of which are incorporated by reference herein in their entirety. The experiments in the next subsection show that the best result through using Gaussian priors only marginally outperforms this approach with 0.45% absolute improvement. However, the number of features needed for the best model with Gaussian priors is ten times of the one with selective gain computation (SGC) selected model. In the process of modeling dependency, not only words themselves were used but also their part-of-speech (POS) tags and grammatical relationship for two levels below the current one. Here, ten-dimensional feature vectors are formed to represent information for each level. For the second component, the mutual information component is further approximated through maximum likelihood estimation.

To explore a bigger feature space and introduce bias for a subset of features, an exemplary progressive multi-stage selective gain computation (SGC) method is provided. At each stage, a feature sub-space is specified through a set of templates. The output model from one stage serves the initial model for the next stage. For the first stage, a uniform distribution or a given prior distribution may be provided.

The parser 103 may successfully identify about 30 functional relations, such as subject, predicate, and object, among words in a sentence. For the MP3 domain data, the dependency parser reaches a precision of 93.86% and a recall of 94.19% on 4800 dependency relations from the 1600 test sentences from 23 subjects, when the models are trained on 4,900 training sentences from about 40 subjects. The same test data set may be used for evaluating task completion rate mentioned in above section entitled "Modeling Language Understanding for Dialog Systems", in which the training data is from both the "Wizard of OZ" (WOZ) setup and a real system setup where the subjects were only given the system functionalities, and they were free to use their own languages.

Experiments with Gaussian Priors and SGC Method

Gaussian priors have been investigated previously by several authors, including, for example, Chen et al., "Efficient Sampling and Feature Selection in Whole Sentence Maximum Entropy Language Models", Proceedings of ICASSP-1999, Phoenix, Ariz., to avoid data sparseness, primarily using constant means and variances for the priors. Application of Gaussian priors has also been explored in domain adaptation, where variable means and variances were estimated in the base domain. An exemplary method of the present invention estimates variable means and variances in the same data set. In addition, given a small amount of training data for MP3 domain, the effect of using Gaussian priors with or without non-trivial feature selection is observed, which is in contrast with other previous methods where feature selection with only cutoff method is used together with Gaussian priors. For the feature selection experiments, the selected gain computation (SGC) method is used. Because of the limited data in MP3 domain, also used is the Wall Street Journal (WSJ) data set, primarily written texts, to contrast the results in both spoken and written languages, and thoroughly test methods in both cases.

The first set of experiments in MP3 domain shows the performance patterns of five different combinations of SGC feature selection and Gaussian priors may lead to, when different amounts of training data are available. The five different combinations are:
  a) no SGC feature selection (only cutoff is used), no Gaussian prior
  b) no SGC feature selection (only cutoff is used), Gaussian prior
  c) SGC feature selection is used, no Gaussian prior
  d) SGC feature selection is used, Gaussian prior in optimization
  e) SGC feature selection is used, Gaussian prior in both feature selection & optimization The 4,900 training sentences are divided into four subsets of equal sizes (25%), and then two and three subsets were randomly selected to form 50% and 75% of training data. All the evaluation tests were conducted on the 1,600 test sentences of MP3 data. FIG. 7 shows a comparison among the five different combinations using different MP3 training data. The results are the prediction accuracy in the conditional probability component $P(L_{i,j}|T_{i,k},T_{k+1,j})$ of the parsing model.

These results show that models with priors usually outperform the models without priors, regardless of whether feature selection is used. When both feature selection and Gaussian priors are used, the resulting models usually perform better than when none of them or only one of them is used. The best performing combination appears to be the use of feature selection and applying prior during feature optimization. Here, the results demonstrate that feature selection alone degrades the performance when no prior is used, which contrasts with the results reported on Wall Street Journal (WSJ) data by Zhou et al., "A Fast Algorithm for Feature Selection in Conditional Maximum Entropy Modeling", In Proceedings of EMNLP 2003, Sapporo, Japan.

The same set of experiments was repeated for Wall Street Journal (WSJ) data but only for the case of using the whole training data set, i.e., sections 02-21. The accuracy results on section 23 are summarized in FIG. 8.

The results show that feature selection improves the performance in cases when priors are used or not used. When priors are used, there is no negative effect on the performance. Both results on MP3 data and Wall Street Journal (WSJ) data show that the combination of feature selection and priors gives better performance on both spoken data and written data. The addition of priors usually improves the performance, and at least it does not have any negative effect on the performance. The feature selection may have a negative impact on the performance when no prior is used and the data set is too small. The latter situation indicates that overfitting is not available in that case.

Figure 9:
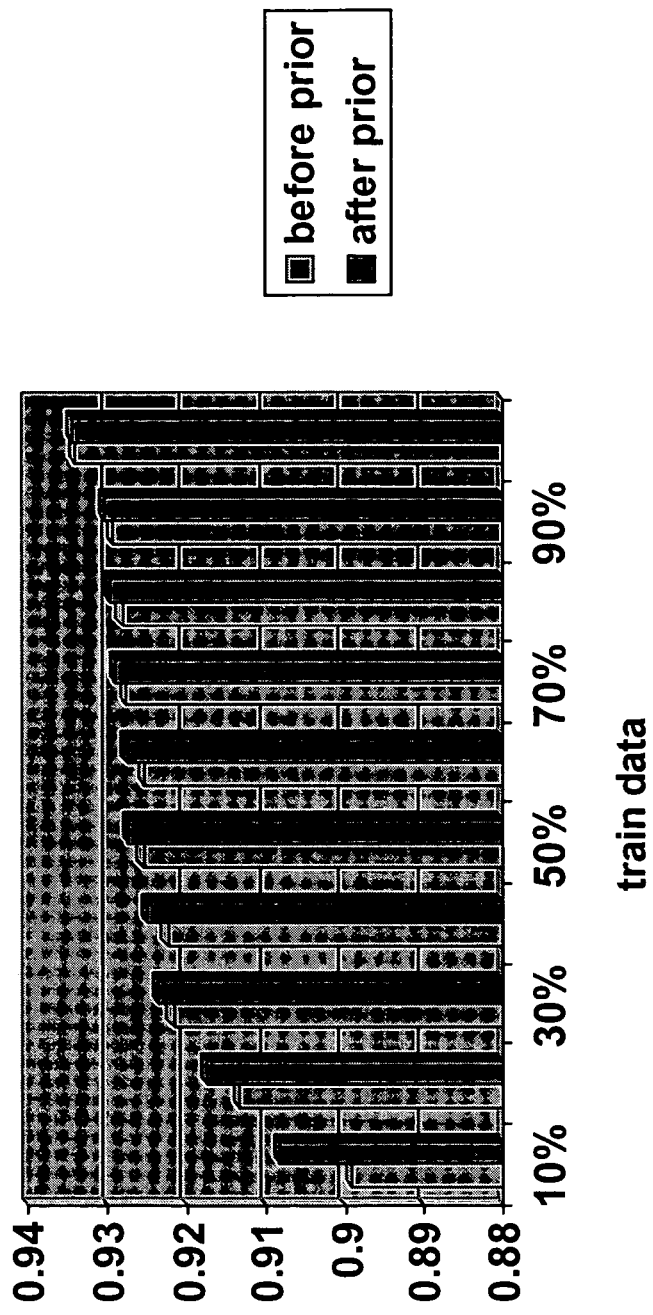
FIG. 9 shows the differing effects of incorporating 10% to 100% of Wall Street Journal (WSJ) training data section 02-21 with Gaussion priors.

A second set of experiments on Wall Street Journal (WSJ) data was conducted to see the effect of Gaussian priors on feature selection when different amounts of training data are available. In this instance, a constant mean and variance was used for all the features. In all the ten cases, 10,000 features are selected using the selective gain computation (SGC) method. FIG. 9 shows the effect with 10% to 100% of Wall Street Journal (WSJ) training data section 02-21. Here, FIG. 9 shows that with a small amount of training data, the improvements from the Gaussian priors are significant with the largest improvement being 0.93% absolute. However, when the amount of training data increases, the benefits are diminishing to 0.024% absolute, which is not statistically significant.

The next set of experiments on the Wall Street Journal (WSJ) data investigates the effect of Gaussian priors on feature selection when the means and variances for the Gaussians are not constant. This set of experiments is only conducted for Wall Street Journal (WSJ) data so that enough sampling time is allowed for. Two approaches were used in estimating the variable means and variances. In both approaches, the means and variances of the priors are computed after the features are selected. Estimation of variable means and variances during feature selection is possible, but very time-consuming. Therefore, they were not used. For the experiments, two baseline models were trained on Wall Street Journal (WSJ) data section 02-21 and 10,000 features were selected using the selective gain computation (SGC) method with cutoffs of 0 and 5. In the first approach, various percentages of the training data were used to compute the means and variances of the Gaussian priors for each feature. In other words, for each feature, 25 samples are used in estimating the means and variances. In the second approach, the training data is partitioned based on the section numbers. A total of 20 subsets were used in computing the means and variances for all the selected features. Again, all the evaluation tests were conducted on section 23 of the Wall Street Journal (WSJ) tree banks. The results are shown in FIG. 10, which demonstrate that when the Gaussian priors are estimated with different amount of training data after the feature selection is performed, there is no statistically significant difference between the models without Gaussian priors and the ones with the Gaussian priors.

As a summary for the last two sets of experiments, when small amount of training data is available, the approach that combines Gaussian priors with the selective gain computation (SGC) feature selection method outperforms both of the approach that only uses cutoff-based feature selection with Gaussian priors, and the approach that uses selective gain computation (SGC) feature selection without Gaussian priors. When there is an adequate amount of training data, there is little or no benefit in combining Gaussian priors with the feature selection method. The latter is likely since feature selection already alleviates the data-overfitting problem to a good extent. A possible trade-off may also be seen between a big model with a small accuracy gain and a much smaller model.

Unified Treatment of Data-Sparseness and Data-Overfitting in ME Modeling

Maximum Entropy (ME) Modeling has a sound mathematical foundation and the flexibility to incorporate many different types of features into a uniform framework. It is a well-tested method and is an important statistical modeling paradigm. However, due to the nature of its optimization process via maximum likelihood estimation, it may still encounter data-sparseness and data-overfitting problems. Existing approaches deal with these two issues separately. An exemplary embodiment and/or exemplary method of the present invention, by contrast, tightly integrates the two processes and leads to a sound, flexible, and unified treatment of these two problems so that high quality and robust models may be built in a straightforward way. Experiments have shown its effectiveness in different cases.

An exemplary embodiment and/or exemplary method is as follows: Given training data X, our goal is to find model M with the highest posterior probability. According to Baysian theory, $$p(M|X) = \frac{p(X|M)p(M)}{p(X)}$$

For any given data X, p(X) is constant. Therefore, $$\arg_m \max p(M|X) = \arg_m \max p(X|M)p(M) = \arg_m \max(\log p(X|M) + \log p(M))$$

Here $\log p(X|M)$ is the log-likelihood term with $$\log p(X|M) = \sum_{x,y} \tilde{p}(x,y) \log p(y|x)$$

and p(M) is the prior term of the model. Based on the statistics from empirical data, the parameters of the model are closer to Gaussian distributions than uniform distributions. Therefore, it may be assumed that $$\log p(M) = \sum_i \log \frac{1}{\sqrt{2\pi\sigma_i^2}} \exp\left(-\frac{(\lambda_i - u_i)^2}{2\sigma_i^2}\right)$$

In the formula, $\lambda_i$ s are the parameters of ME model, $\mu_i$ and $\sigma_i$ are mean and variance of the corresponding Gaussian distributions for each parameter.

Thus, to find a model better accounting for the natural language understanding (NLU) data, Maximum a Posterior (MAP) criterion is used instead of ML criterion. Accordingly, the new objective function may be represented as:

$$L'(p) = \log p(X|M) + \log p(M)$$

With Gaussian Prior, the Maximum a Posterior (MAP) model no longer satisfies the maximum entropy (ME) constraint exactly. Instead, the constraint has the form:

$$\sum_{x,y} \tilde{p}(x,y) f_i(x,y) - \frac{\lambda_i - \mu_i}{\sigma_i^2} = \sum_{x,y} \tilde{p}(x) p(y|x) f_i(x,y)$$

The present invention provides two exemplary methods with regards to Gaussian Priors—one is the incorporation of Gaussian Priors during feature selection process, and the other is the incorporation of Gaussian Priors during parameter optimization process. In this regard, the feature selection process may include, for example, the selective gain computation (SGC) feature selection method which is described, for example, in U.S. patent application Ser. No. 10/613,366, entitled "A Fast Feature Selection Method and System for Maximum Entropy Modeling", which was filed Jul. 3, 2003, and by Zhou et al., "A Fast Algorithm for Feature Selection in Conditional Maximum Entropy Modeling", In Proceedings of EMNLP 2003, Sapporo, Japan, and the parameter optimization process may include, for example, the SCGIS feature optimization process which is described, for example, by Goodman, "Sequential Conditional Generalized Iterative Scaling", Association for Computational Linguistics, Philadelphia, Pa., although principles of the exemplary embodiment and/or exemplary method should be applicable to other methods as well.

When Gaussian Priors are applied during feature selection, the new approximate gain with an added feature f to a selected feature set S is computed as:

$$\hat{G}_{S,f}(\alpha) \equiv L'(p_{S,f}^\alpha) - L'(p_S) = G_{S,f}(\alpha) - \frac{(\alpha - u)^2}{2\sigma^2} + \log\frac{1}{\sqrt{2\pi\sigma^2}} \quad (2.1)$$

The first and second derivatives of $\hat{G}$ are obtained as:

$$\hat{G}'_{S,f}(\alpha) = G'_{S,f}(\alpha) - \frac{\alpha - \mu}{\sigma^2}$$

$$\hat{G}''_{S,f}(\alpha) = G''_{S,f}(\alpha) - \frac{1}{\sigma^2}$$

where $\alpha$ is the weight for feature f, and $G_{S,f}(\alpha)$, $G'_{S,f}(\alpha)$, $G''_{S,f}(\alpha)$ are gain and its derivatives under the condition without Gaussian prior, which can be computed, for example, using techniques described in U.S. patent application Ser. No. 10/613,366, entitled "A Fast Feature Selection Method and System for Maximum Entropy Modeling", which was filed Jul. 3, 2003, or by Berger et al. "A Maximum Entropy Approach to Natural Language Processing", Computation Linguistic, 22 (1):39-71 (1996).

Therefore, the new α is computed using Newton method based on following formula:

$$\alpha_{n+1} = \alpha_n + \frac{1}{r}\log\left(1 - \frac{1}{r}\frac{\hat{G}'_{S,f}(\alpha_n)}{\hat{G}''_{S,f}(\alpha_n)}\right) \quad (2.2)$$

Similar to the initialization step in SGC, α(j, 0) and g(j, 0) are computed using (2.2) and (2.1) respectively, instead of the closed-form formula described in U.S. patent application Ser. No. 10/613,366, entitled "A Fast Feature Selection Method and System for Maximum Entropy Modeling", which was filed Jul. 3, 2003.

When the Gaussian Priors are applied during parameter optimization, the parameter updates are computed through the following steps.

In each iteration, $$\lambda_i^{(t+1)} \leftarrow \lambda_i^{(t)} + \delta_i^{(t)}, \text{ and}$$

$\delta_i^{(t)}$ is computed based on following:

$$\sum_{x,y} \tilde{p}(x,y) f_i(x,y) = \sum_{x,y} \tilde{p}(x) p(y|x) f_i(x,y) \exp(\delta_i^{(t)} f\#(x)) + \frac{(\lambda_i^{(t)} - u_i) + \delta_i^{(t)}}{\sigma_i^2}$$

Again Newton method is used to calculate $\delta_i^{(t)}$.

The stopping criterion remains the same, i.e., when L'(p) doesn't increase any more, the up-date iteration stops, where L'(p) is computed as:

$$L'(p) = \log p(X|M) + \log p(M)$$
$$= \sum_{x,y} \tilde{p}(x,y) \log p(y|x) - \sum_i \frac{(\lambda_i - u_i)^2}{2\sigma_i^2} + const(\wedge)$$

What is claimed is:

1. A computer-implemented method for modeling spoken language for a conversational dialog system, comprising:
   modeling, by a computer processor, dependency relations of the spoken language via a probabilistic dependency model;
   incorporating, by the computer processor, Gaussian priors during feature selection and during parameter optimization;
   parsing, by the computer processor, a sequence of words, the parsing including systematically searching through pairs of head words bottom-up using a chart parsing technique; and
   at each step in the search, computing, by the computer processor, the probabilistic scores for each pair based on the probabilistic dependency model and keeping n best candidate pairs for each region;
   wherein the dependency model is decomposed into a model for a first sub-region, a second sub-region, and a component which includes a last dependency relation that connects the first and second sub-regions, with an adjustment of mutual information between the last dependency relation and the first and second sub-regions.

2. The method of claim 1, further comprising:
incorporating a Gaussian priors during feature selection and during parameter optimization for construction of a statistical model, wherein the incorporated Gaussian priors have a plurality of parameters between which calculated means and variances vary.

3. The method of claim 2, wherein the statistical model includes a conditional maximum entropy model.

4. The method of claim 2, wherein feature selection includes a selective gain (SCG) computation method.

5. The method of claim 2, further comprising:
calculating a Gaussian distribution for each parameter of the statistical model.

6. The method of claim 2, further comprising:
calculating a Gaussian distribution for each selected feature of the statistical model.

7. The method of claim 1, wherein the probabilistic dependency model includes a conditional maximum entropy model.

8. The method of claim 1, wherein feature selection includes a selective gain (SCG) computation method.

9. The method of claim 1, further comprising:
calculating a Gaussian distribution for each parameter of the probabilistic dependency model.

10. The method of claim 1, further comprising:
calculating a Gaussian distribution for each selected feature of the probabilistic dependency model.

11. The method of claim 1, wherein:
the dependency model for a region $\overline{L}_{i,j}$ extending between word i and word j is calculated as $P(\overline{L}_{i,j})=P(\overline{L}_{i,k})*P(\overline{L}_{k+1,j})*P(L_{i,j}|\overline{L}_{i,k},\overline{L}_{k+1,j})*e^{MI(\overline{L}_{i,k},\overline{L}_{k+1,j})}$;
(i, k) is a first sub-region of the region $\overline{L}_{i,j}$;
(k+1, j) is a second sub-region of the region $\overline{L}_{i,j}$;
$L_{i,j}$ is a triple of $1_{i,j}$, $W^{i,k}$, and $W^{k+1,j}$;
$1_{i,j}$ is a last dependency relation that connects the first and second sub-regions;
$W^{i,k}$ is a head word representing the first sub-region; and
$W^{k+1,j}$ is a head word representing the second sub-region.

12. A dialog system comprising:
a computer processor programmed to execute a spoken language understanding software module arrangement, the software module arrangement comprising:
a speech recognizer module, which, when executed by the processor, causes the processor to recognize speech as a sequence of words;
a part-of-speech tagger module, which, when executed by the processor, causes the processor to tag the sequence;
a statistical dependency parser, which the processor is configured to use to form dependency structures for the sequence;
a semantic mapper module, which, when executed by the processor, causes the processor to map grammatical features to the sequence;
a topic classifier module, which, when executed by the processor, causes the processor to classify the sequence into at least one semantic category; and
a dialog manager module, which, when executed by the processor, causes the processor to interpret meaning of the sequence in a context of a conversation;
wherein the statistical dependency parser is based on dependency relations of the spoken language via a probabilistic dependency model, and wherein the dependency model is decomposed into a model for a first sub-region, a second sub-region, and a component which includes a last dependency relation that connects the first and second sub-regions, with an adjustment of mutual information between the last dependency relation and the first and second sub-regions.

13. The spoken language understanding module arrangement of claim 12, wherein the parser systematically searches through pairs of head words bottom-up using a chart parsing technique, and at each step in the search, computes probabilistic scores for each pair based on a dependency model.

14. The spoken language understanding module arrangement of claim 13, wherein the dependency model includes a conditional maximum entropy model.

15. The spoken language understanding module arrangement of claim 14, wherein the conditional maximum entropy model includes a conditional maximum entropy model trained with Gaussian priors during parameter optimization.

16. The spoken language understanding module arrangement of claim 14, wherein the conditional maximum entropy model includes a conditional maximum entropy model trained with Gaussian priors during feature selection and during parameter optimization.

17. The spoken language understanding module arrangement of claim 16, wherein the feature selection includes a selective gain (SCG) computation method.

18. A computer-implemented method for modeling spoken language for a conversational dialog system, comprising:
modeling, by a computer processor, dependency relations of the spoken language via a probabilistic dependency model;
incorporating, by the computer processor, Gaussian priors during feature selection and during parameter optimization;
parsing, by the computer processor, a sequence of words, the parsing including systematically searching through pairs of head words bottom-up using a chart parsing technique; and
at each step in the search, computing, by the computer processor, the probabilistic scores for each pair based on the probabilistic dependency model and keeping n best candidate pairs for each region;
wherein the dependency model is decomposed into a model for a left branch of a parse tree, a right branch of the parse tree, a conditional probability of a top level that connects the left and right branches, and an adjustment of mutual information between the top level and the left and right branches.

* * * * *